(12) United States Patent
Kirts et al.

(10) Patent No.: US 7,025,887 B1
(45) Date of Patent: Apr. 11, 2006

(54) SAND FILTER TREATMENT FACILITY AND METHOD FOR REMOVING TOXIC METALS FROM STORM WATER

(75) Inventors: Richard Eugene Kirts, Oxnard, CA (US); Mark Erik Foreman, Santa Barbara, CA (US); Gary Daniel Anguiano, Oxnard, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/116,162

(22) Filed: Apr. 21, 2005

(51) Int. Cl.
*C02F 1/42* (2006.01)

(52) U.S. Cl. .................... 210/681; 210/688; 210/747; 210/170; 210/263; 210/284

(58) Field of Classification Search ............... 210/688, 210/681, 747, 170, 263, 284
See application file for complete search history.

(56) References Cited

U.S. PATENT DOCUMENTS 6,190,548 B1 * 2/2001 Frick .......................... 210/170
6,719,910 B1 * 4/2004 Thiem et al. ............... 210/702

* cited by examiner

*Primary Examiner*—Chester T. Barry
(74) *Attorney, Agent, or Firm*—David S. Kalmbaugh

(57) ABSTRACT

A treatment facility for removing toxic metals from storm water runoff to provide clean water. The treatment facility includes a pretreatment chamber for removing large toxic particles from the storm water runoff and absorbent chamber for removing fine particles of toxic metals from the storm water runoff. The absorption chamber has an absorption bed of three absorptive materials for removing the fine particles of toxic metals from the storm water runoff.

16 Claims, 8 Drawing Sheets

SAND FILTER TREATMENT FACILITY AND METHOD FOR REMOVING TOXIC METALS FROM STORM WATER

BACKGROUND OF THE INVENTION

1. Field of the Invention

The present invention relates generally to the removal of pollutants and cleanup of storm water and wastewater. More particularly, the present invention relates to materials for removing toxic metals from storm water runoff and wastewater.

2. Description of the Prior Art

The military including the Department of Navy are under increasing pressure from regulators and local communities to substantially reduce the amount of pollutants being discharged with storm water into harbors, bays, lakes, and streams. The military needs to remove toxic contaminants from runoff water, to avoid Notices of Violation of environmental statutes and regulations by Federal, state and local regulatory agencies to avoid costly fines and improve the public perception of military's environmental stewardship.

Military installations must now comply with National Pollutant Discharge Elimination System (NPDES) storm water permit requirements. Compliance needs to achieved by completing a multi-phase process. An important step in this process is implementation of non-structural (or pollution prevention) best management practices (BMP) to reduce the amount of pollutants that enter storm water runoff. Non-structural BMPs are usually simple changes in management practices that reduce the potential contamination of storm water runoff. Examples of non-structural BMPs include activities such as regularly sweeping work areas, training employees to properly dispose of wastes, cleaning catch basins, and storing materials under covered areas.

However, implementation of best management practices pollution prevention alone may not be adequate to comply with discharge regulations requirements. If all applicable management practices have been implemented and contaminants in the storm water runoff from the site still exceed the permitted discharge limits, then treatment of the storm water runoff is required. Treatment of storm water runoff to reduce runoff volume or pollutant concentration is termed structural best management practice.

Storm water runoff from military industrial operations can be roughly characterized has having elevated metal content, moderate suspended solids and organic content, and low nutrient and bacterial content. The elevated metal content in storm water runoff from Navy industrial sites can be attributed to outdoor metal working processes such as cutting and grinding, storage of metal objects outdoors, and use of metal bearing materials such as corrosion inhibiting and anti-fouling paints.

Storm water runoff from military industrial sites is not easily treated by current commercial off-the-shelf technology. Most of the current technology is designed for municipal applications such as trash, nutrient, and sediment removal. Also, most storm water treatment technology requires large areas of land for infiltration basins and similar structures. Space is often at a premium at many military sites, especially waterfront locations.

The main chemicals of concern for example at a military port or harbor are copper, mercury, zinc, total chlordane, total PCBs, and PAHs (poly-aromatic hydrocarbons). Contaminated sediments at a harbor or port facility pose a substantial threat to aquatic life, wildlife, fisheries, and human health. Fish and bottom-dwelling creatures suffer disease, death, reproductive failure, or impaired growth upon exposure to pollutants in the sediment. Trace metals (i.e., copper, mercury, zinc) in the sediments are harmful particularly because they persist in the marine environment and bio-accumulate up the food chain, traveling from marine organisms to fish then to humans.

The U.S. Environmental Protection Agency issued Federal regulations for storm water discharges (40 CFR Parts 122, 123, and 124). These regulations require specific categories of facilities that discharge storm water associated with industrial activity to obtain a National Pollution Discharge Elimination System permit. In addition, facilities are required to implement Best Available Technology Economically Achievable and Best Conventional Pollutant Control Technology to reduce or eliminate industrial storm water pollution. The EPA developed a four-tier permit issuance strategy for storm water discharges associated with industrial activities. These are:

Tier I, Baseline Permitting—One or more general permits will be developed to initially cover the majority of storm water discharges associated with industrial activity.

Tier II, Watershed Permitting—Facilities within watersheds shown to be adversely impacted by storm water discharges associated with industrial activity will be targeted for individual or watershed-specific general permits.

Tier III, Industry-Specific Permitting—Specific industry categories will be targeted for individual or industry-specific general permits.

Tier IV, Facility-Specific Permitting—A variety of factors will be used to target specific facilities for individual permits.

The EPA regulations allow States to issue General Permits or individual permits to regulate storm water discharges. The General Permit generally requires dischargers to:

A. Eliminate unauthorized non-storm water discharges;

B. Develop and implement a storm water pollution prevention plan; and

C. Perform monitoring of storm water discharges and authorized non-storm water discharges.

Activities that take place at industrial facilities, such as material handling and storage, are often exposed to storm water. The runoff from these activities discharges industrial pollutants into nearby storm sewer systems and water bodies which may adversely impact water quality.

To limit pollutants in storm water discharges from military industrial facilities, a National Pollution Discharge Elimination System (NPDES) Phase I Storm Water Program includes an industrial storm water-permitting component. Operators of industrial facilities included in one of the 11 categories of storm water discharges associated with industrial activity set forth at 40 CFR 122.26 (b) (14) (I)–(xi) that discharge storm water to a municipal separate storm sewer system or directly to waters of the United States require authorization under a NPDES industrial storm water permit. If an industrial facility has a Standard Industrial Classification code or meets the narrative description listed in the 11 categories, the facility operator must determine if the facility is eligible for coverage under a general or an individual NPDES industrial storm water permit. Of the 11 categories of storm water discharges associated with industrial activity, those applicable to the Navy are described below:

Category 1: Facilities Subject To Storm Water Effluent Limitations Guidelines, New Source Performance Standards, Or Toxic Pollutant Effluent Standards.

Category 4: Hazardous Waste Treatment, Storage, or Disposal Facilities.

Category 5: Landfills, Land Application Sites, And Open Dumps Receiving Industrial Wastes.

Category 6: Recycling Facilities.

Category 8: Transportation Facilities.

Category 9: Sewage or Wastewater Treatment Works.

Category 10: Construction Activities Including Cleaning, Grading, and Excavation of Areas Over Five Acres.

Category 11: Light Industry Where Industrial Materials, Equipment, or Activities are Exposed to Storm Water.

The US EPA report Overview of the Storm Water Program (EPA document EPA 833-R-96-008) documents the environmental requirements under Federal regulations for removal of pollutants from storm water runoff.

Many military installations will also be affected by the proposed EPA total maximum daily load (TMDL) rule. TMDL is the amount of a pollutant that a stream, lake, estuary or other water body can accept without violating state water quality standards. Once a TMDL is established, responsibility for reducing pollution is assigned. Thus, military installation's point and non-point sources may be subject to discharge limitations set by TMDLs. TMDL based regulations are slowly being developed and affect few military activities at this time. State or local regulations may be more stringent than Federal regulations.

SUMMARY OF THE INVENTION

The present invention overcomes some of the difficulties of the past including those mentioned above in that it comprises a relatively simple in design yet highly effective sand filter treatment facility for removing metals such as copper and zinc from storm water runoff In a preferred embodiment, the treatment facility, which is buried in the ground includes a base, four upstanding concrete side walls, a concrete cover and two parallel concrete inner walls A primary pretreatment chamber is formed between one side wall and a first of the two inner walls. A secondary pretreatment chamber is formed adjacent to the primary pretreatment chamber between the two inner walls. Fluid flow between the primary pretreatment chamber and the secondary pretreatment chamber is through an opening between the chambers.

An absorbent chamber is formed adjacent to the secondary pretreatment chamber between the second of the two inner walls and a second side wall. An weir is provided near the upper end of second inner wall to allow for fluid flow between secondary pretreatment chamber and the absorption chamber.

An inlet grate is located at ground level within concrete cover above the primary pretreatment chamber.

Located at the bottom of absorbent chamber is a perferated collection pipe which has a plurality of openings Three layers of absorbent materials, which comprise an absorption bed, are stacked one on top of another above collection pipe. The bottom layer of absorbent material is FS-50 Activated alumina, the middle layer of absorbent material is bone char and the top layer of absorbent material is sand. Water flow is through the primary and secondary pretreatment chambers and the filter bed. The pretreatment chambers remove large metal particles (1/64 to 1 inch in diameter) and the filter beds remove smaller metallic particles and very fine sediments (e.g. 2–200 microns). Clean water exits the treatment facility through a collection pipe into the ground.

DETAILED DESCRIPTION OF THE PREFERRED EMBODIMENTS

Figure 1:
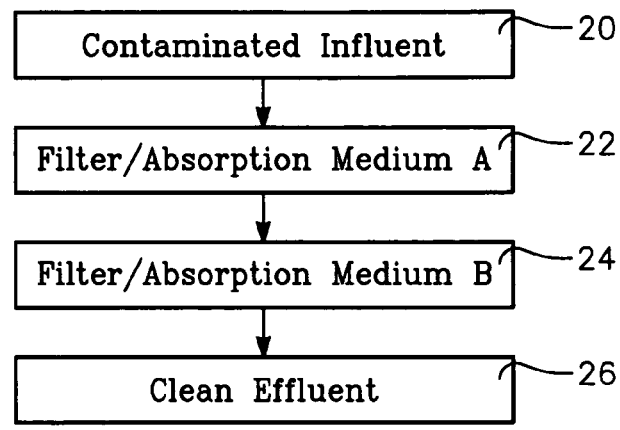
FIG. 1 illustrates a simplified embodiment of the present invention for removing metals from storm water runoff.

Referring to FIG. 1, the invention illustrated in FIG. 1 is designed to remove metals (in both solid and dissolved form) from storm water runoff. The invention of FIG. 1 may also be used to ship bilge and compensating ballast water, from plating shop wastewater, from pipe cleaning process wastewater, and from other wastewater streams containing solid and dissolved metals.

Wasterwater (block 20) contaminated with metals in solid and dissolved form enters media bed A (block 22). As the wastewater runs through the media bed A, particles of metal are filtered out of the wastewater and metal ions are absorbed on the media material in bed A. After exiting media bed A, the wastewater passes through media bed B (block 24). As the wastewater runs through media bed B, additional particles of metal are filtered out of the wastewater and metal ions are absorbed on the media material in bed B, resulting in a clean a effluent (block 26). In some applications the media material in beds A and B may be mixed together in a single bed.

Two or more different types of media are used to remove metals from wastewater because each media type is generally better at removing one specie of metal than another specie of metal. For example, media A may be effective at removing copper but not very effective at removing zinc. Media B may be effective at removing zinc but not very effective at removing copper.

In another situation, media A may be effective at removing two different species of metal but not a third specie of metal. Media is then used to remove the third specie of metal. For example, using certain types of activated alumina (media A) are very effective at removing copper and zinc from wastewater. However, activated alumina adds a aluminum to the wastewater stream. A second layer of media, such as manganese green sand is used to remove the added aluminum from the wastewater being treated.

The use of the technology illustrated in FIG. 1 to remove metals from wastewater has several advantages including high pollutant removal efficiency, high pollutant retention capacity and low cost. The materials used to remove pollutants from wasterwater are common industrial costing less than dollar a pound, have mineral like properties and are very durable.

Twenty-four different materials were identified as possible storm water runoff treatment materials. These materials are classified by the following terms: organic materials, active minerals, inert minerals, proprietary materials, and other. Table 1 tabulates the materials.

TABLE 1

POTENTIAL STORM WATER TREATMENT MATERIALS

| Organic minerals | Active minerals | Inert materials | Proprietary materials | Other |
|---|---|---|---|---|
| Loose peat moss | A-400 activated alumina | Perlite | Forager sponge cubes | iron chips and filings |
| Hardwood chips | FS-50 activated alumina | Washed plaster's sand | Dynaphore granules | Sodium alginate beads |
| Bone char | DD-2 activated alumina | Washed concrete sand | Ancor M-20/80 zero valence iron | Geotextile |
| Anthracite | Zeolite (chabasite) | Washed well packing gravel | Stormwater Management Metal Rx | |
| Sulphonated peat moss | Zeolite (glauconite) limanite Manganese green sand | | Environmental H2O LLC White Karbon | |

These materials were placed in 1.5-inch diameter clear plastic cylinders that served as filtration and adsorption test columns. Six columns were mounted on a common inlet manifold. The flow-through each column was individually adjusted with a flow meter at the discharge end of the column. All columns were filled with media to a depth of 18 inches. For the initial material screening tests, the empty bed contact time (EBCT) of each column was set to 30 minutes by adjusting the water flow rate through the column. The EBCT is equal to the volume of material divided by the flow rate and is the theoretical maximum fluid contact (or residence) time. A long EBCT was selected for these initial tests because the low flow rate minimized the consumption of runoff water and maximized adsorption.

Each series of tests consisted of 5 columns filled with a medium of interest and the sixth column filled will a standard, washed sand filter sand. The sand filled column served as a baseline to help distinguish between how much pollutants was removed by simple mechanical straining and how much pollutant was removed by a combination of straining and adsorption.

The influent water used for these tests was runoff water from an "artificial" rain event conducted at the Naval Regional Recycling Center (NRRC), in San Diego, Calif. Table 2 lists the initial concentrations of pollutants in the water.

TABLE 2

CHEMICAL ANALYSIS OF RUNOFF WATER FROM ARTIFICIAL RAIN

| Substance | Concentration in Storm Water, µg/L | Multi-Sector Permit Requirement, µg/L |
|---|---|---|
| Aluminum | 2,800 | 750 |
| Cadmium | 50 | 15.9 |
| Chromium | ND | 20[(1)] |
| Copper | 1,800 | 64 |
| Iron | 6,100 | 1000 |
| Lead | 280 | 82 |
| Zinc | 2,400 | 117 |
| MBAS[(1)] | 690 mg/L | No value listed |
| PH[(1)] | 8.3 SU | No value listed |
| TS | 270 mg/L | 100 mg/L |

[(1)]benchmark value. No Multi-sector permit criteria given.

Figure 2:
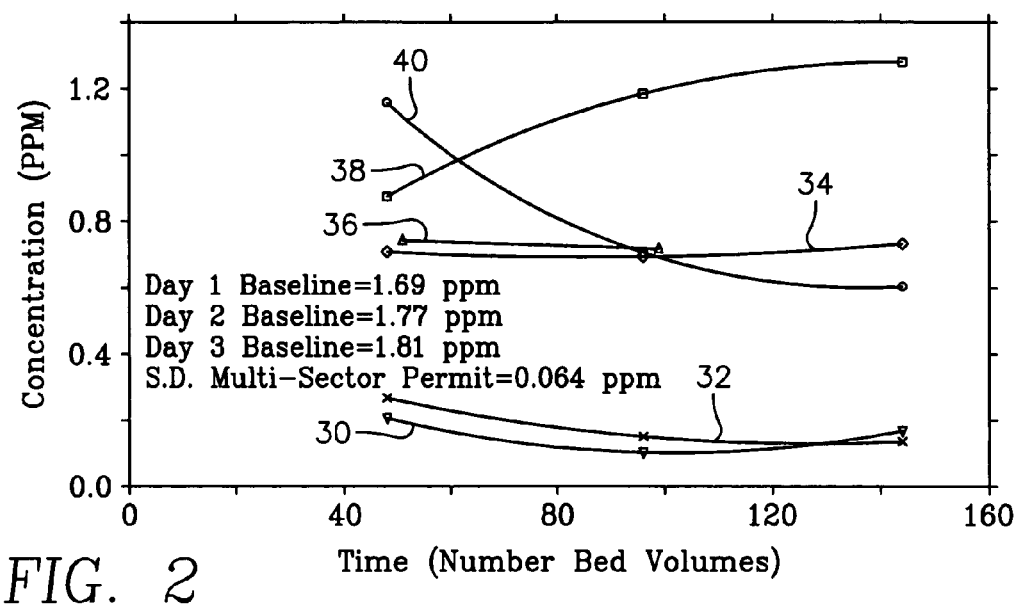
FIGS. 2 and 3 are plots which depict long empty bed contact time absorption test for copper and aluminum, respectively.
Figure 3:
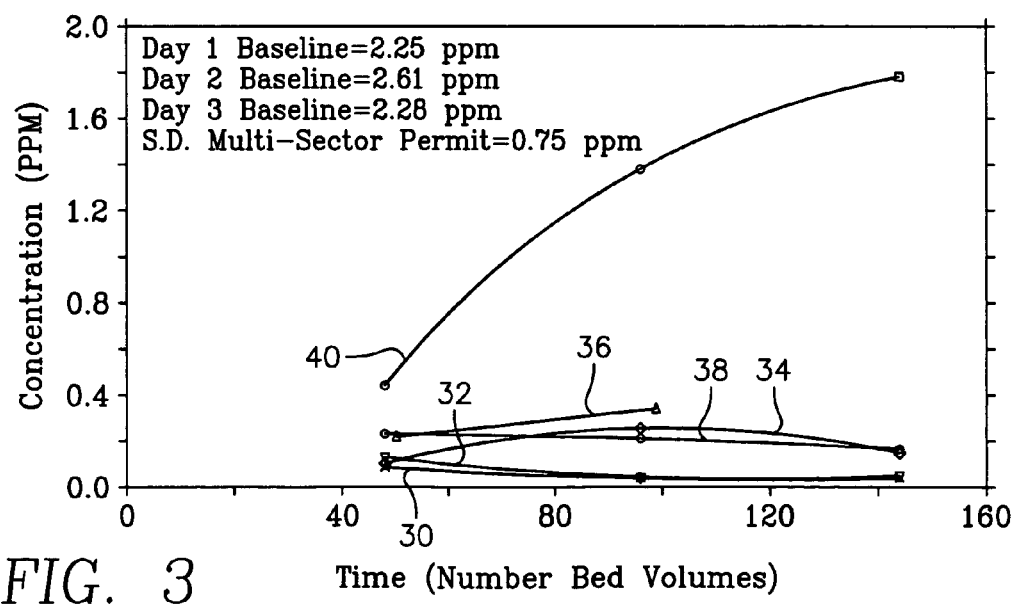

Referring to FIGS. 2 and 3, FIG. 2 displays some typical column test results for copper. FIG. 2 is one of 28 plots of experimental data covering 4 sets of experiments and 7 metals. For FIG. 2, the metal represented by plot 30 is iron chips; the metal represented by plot 32 is activated alumina FS50; the material represented by plot 34 is washed concentrate sand >1 mm; the material represented by plot 36 is sodium algenate beads; the material represented by plot 38 is SE75 Sand >2 mm and the material represented by plot 40 is Geo-Fabric. The data are presented as concentration of total metal in the effluent as a function of time. The time is expressed as number of bed volumes. In this case, 48 bed volumes is about 1 day of operation.

Test results indicate that a simple sand filter can generally remove about 50% of the metals in the runoff water. FIG. 3 shows that for those metals that are less soluble and in the form of larger particles (for example, aluminum) the percentage is higher. The numbers identifying plots in FIG. 2 are identical to the numbers in FIG. 3. For example, plot 30 represents iron chips and plot 32 represents activated alumina FS50. Tests of several media were terminated early due to media failure. Some media were in the form of very small particles (e.g. Ancor M-20/80 zero valence iron). This resulted in the column quickly plugging from suspended solids in the influent.

Other media types, especially organic media, quickly decomposed. Peat moss was one of the more effect media at removing metals from the runoff water, but it decomposed over a short period (a matter of a few days) to form a dense mass that plugged the column.

Elemental iron was found to be very effective at removing copper from water, but at the cost of adding iron ions to the effluent. This may be a reasonable exchange in some applications, but at NRRC, San Diego the iron concentration already exceeds the multi-sector permit value.

Activated alumina compounds were found to be effective at removing many metal species from solution. However, alumina compounds generally added a significant amount of aluminum to the effluent stream.

Short contact time adsorption tests were performed on selected materials. Selected materials were tested to determine their performance at shorter residence times. Since the required depth and cost) of the filter or adsorption bed is proportional to the residence time, a short residence time is preferred. For storm water treatment, a residence time of less than 5 minutes is preferred. Typical result for zinc concentration as a function of empty bed contact time are as follows for a time period having a range of 2 minutes to 15 minutes. For Fonger granules the concentration is approximately 0.01 mg/L over the time period. For peat moss the concentration varies from 0.01 mg/L to 0.1 mg/L over the time period. For bone char the concentration varies from 0.01 mg/L to 0.22 mg/L over the time period. For activated alumina FS50 the concentration varies from 0.75 mg/L to 0.32 mg/L over the time period. For gravel/sand the concentration varies from 0.5 mg/L to 0.58 mg/L over the time period. For Dynaphore the concentration varies from 0.53 mg/L to 0.7 mg/L over the time period. For the influent the concentration remains at 0.69 mg/L over the time period. The general result is that over the range of EBCTs evaluated, the effectiveness of most media does not significantly decrease as the EBCT is shortened. This is the expected result if chemical adsorption is the dominant metal removal mechanism, since binding by van der Waals attraction is practically instantaneous.

Figure 4:
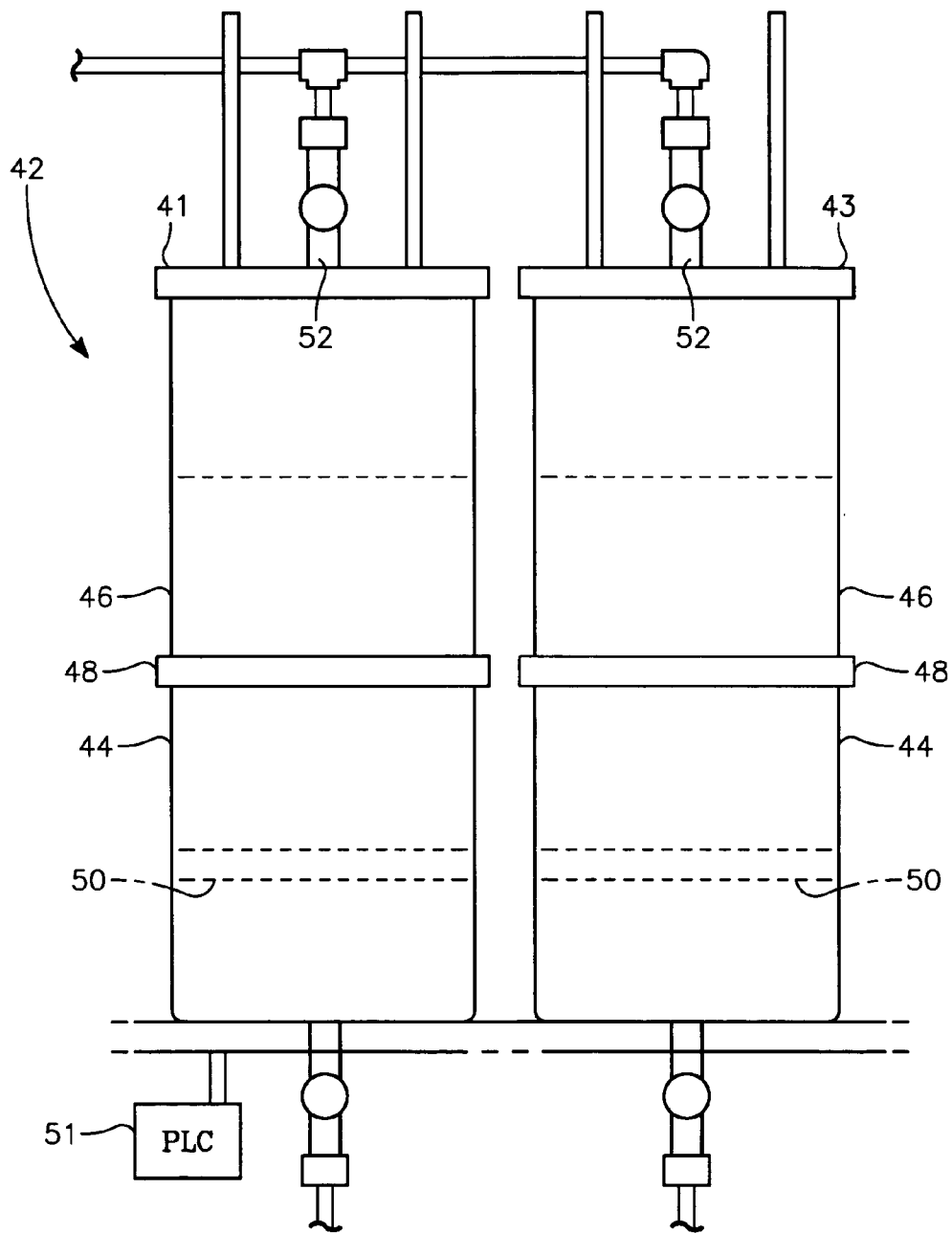
FIG. 4 illustrates a dual chamber test device for evaluating storm water treatment materials.

Referring to FIG. 4, a dual chamber filtration and adsorption apparatus 42 was constructed to aid in evaluating combinations of promising storm water treatment materials. FIG. 4 shows the dual chamber apparatus 42. It was observed from the results of the column tests using apparatus 42 that some media removed one metal while adding another. For example, some activated alumina compounds removed copper but added aluminum to the effluent stream. Other compounds, such as manganese green sand, proved very effective at removing aluminum from the influent stream. Thus, a determination needed to may made as to whether layers of different media perform better than a single layer of media. The dual chamber apparatus 42 allows the testing of different combinations, or layers, of media.

Each chamber 41 and 43 of the dual chamber filtration and adsorption apparatus 42 consists of two vessels 44 and 46 stacked one upon the other. The bottom the upper vessel 46 was removed and replaced with a perforated plastic plate 48. A perforated plastic shelf 50 supports the medium in the lower vessel 44. A layer of geotextile was placed over each support shelf to retain the media.

The vessels 44 and 46 are 12 inches in diameter. Typical bed depth is 6 inches of media. This gives a bed surface area to bed perimeter ratio sufficient to minimize edge effect. Edge effect is when a significant amount of the water flow through a column flows through the perimeter of the column, rather than through the media. Edge effect reduces the removal efficiency of the media, since the portion of the water that flows down the perimeter of the vessel is not as effectively treated as the water that flows through the center of the media bed.

The dual chamber apparatus 42 is operated by a programmable logic controller 52 that can either (1) maintain a constant head of water on the upper chamber 46, at an inlet port 52 at the top of vessels 46 or (2) rain on the upper vessel 46 for a specified period. The latter option allows for a more natural rain-drain-dry sequence of bed operation.

The results using four non-proprietary media were found to provide excellent pollutant removal. The performing media tested using apparatus 42 were: activated alumina, activated alumina with a surface coating of iron oxide, bone char, and manganese green sand. All are common materials which are inexpensive industrial chemicals.

Activated alumina and bone char are commonly used to remove arsenic and fluoride from drinking water. The activated alumina used in the test is Alcan Chemicals Corporation's AA-400 product. AA-400 is a Claus catalyst formed by the precipitation of aluminum hydroxide. AA-400 grade features higher macro-porosity than most grades of activated alumina.

Bone char is a black, granular solid obtained by calcining cattle bones. Through the calcining process crushed bone is stripped clean, leaving carbon and tricalcium phosphate. Bone char is used to adsorb heavy metals, fluorides, and iron. It has a low total surface area, but for certain compounds, bone char out performs bituminous, lignite or coal based activated carbon products. Bone char may also be effective at removing organic molecules from water, but tested was not performed at this time.

Some activated alumina products were found to significantly increase the concentration of aluminum in the effluent. It was determined that manganese green sand effectively removed the additional aluminum from the waste stream. Manganese green sand is made from gluaconite zeolite and is commonly used to removing iron, manganese, and hydrogen sulfide from water through oxidation and precipitation. Greensand is an industrial mineral commonly used in water treatment systems.

Combinations of media were found to be more effect than any single medium. The best performing media combinations were found to be: (a) A layer of bone char over a layer of iron coated activated alumina, and (b) A layer of bone char, a layer of activated alumina, and a layer of manganese greensand.

Some results of these studies are presented in Table 3 to 12. Concentrations are in mg/L. The metal concentrations were determined using EPA Method 200.7—Inductively-Coupled Plasma Atomic Emission Spectroscopy.

The results are for a total empty bed contact time (EBCT) of 10 minutes, i.e., the contact time in each bed was 5 minutes. The exception to this is the bone char/activated alumina/green sand combination, in which the contact time in each bed was 3 minutes.

It should be noted that in this application it is the value of the metal concentration in the effluent that is important, not the removal effectiveness. The goal is to get the copper concentration below 50 mg/l and the zinc concentration below 100 mg/l.

TABLE 3

RESULTS FOR FS-50 ONLY

| Metal | Influent, mg/l | Effluent, mg/l | Detection Limit, mg/l |
|---|---|---|---|
| Aluminum | 2.8 | 0.040 | 0.04 |
| Cadmium | 0.049 | ND | 0.008 |
| Chromium | 0.022 | ND | 0.008 |
| Copper | 1.75 | 0.135 | 0.006 |
| Iron | 6.1 | 0.112 | 0.008 |
| Lead | 0.28 | 0.030 | 0.014 |
| Zinc | 2.4 | 0.115 | 0.01 |

TABLE 4

RESULTS FOR BONE CHAR ONLY

| Metal | Influent, mg/l | Effluent, mg/l | Detection Limit, mg/l |
|---|---|---|---|
| Aluminum | 0.179 | 0.080 | 0.04 |
| Cadmium | 0.009 | ND | 0.008 |
| Chromium | ND | ND | 0.008 |
| Copper | 0.833 | 0.108 | 0.006 |
| Iron | 0.141 | 0.065 | 0.008 |
| Lead | 0.034 | 0.020 | 0.014 |
| Zinc | 0.254 | 0.130 | 0.01 |

TABLE 5

RESULTS FOR DD-2 ACTIVATED ALUMINA ONLY

| Metal | Influent, mg/l | Effluent, mg/l | Detection Limit, mg/l |
|---|---|---|---|
| Aluminum | 0.179 | 0.221 | 0.04 |
| Cadmium | 0.009 | ND | 0.008 |
| Chromium | ND | ND | 0.008 |
| Copper | 0.833 | 0.113 | 0.006 |
| Iron | 0.141 | 0.080 | 0.008 |
| Lead | 0.034 | 0.028 | 0.014 |
| Zinc | 0.254 | 0.160 | 0.01 |

TABLE 6

RESULTS FOR FS-50 OVER BONE CHAR

| Metal | Influent, mg/l | Effluent, mg/l | Detection Limit, mg/l |
|---|---|---|---|
| Aluminum | 0.42 | 0.044 | 0.04 |
| Cadmium | ND | ND | 0.008 |
| Chromium | ND | ND | 0.008 |
| Copper | 0.50 | 0.069 | 0.012 |
| Iron | 1.7 | 0.16 | 0.008 |
| Lead | 0.017 | ND | 0.014 |
| Zinc | 0.30 | 0.11 | 0.01 |

TABLE 7

RESULTS FOR BONE CHAR OVER FS-50

| Metal | Influent, mg/l | Effluent, mg/l | Detection Limit, mg/l |
|---|---|---|---|
| Aluminum | 0.16 | 0.075 | 0.04 |
| Cadmium | ND | ND | 0.008 |
| Chromium | ND | ND | 0.008 |
| Copper | 0.38 | 0.088 | 0.006 |
| Iron | 0.46 | 0.23 | 0.008 |
| Lead | ND | ND | 0.014 |
| Zinc | 0.25 | 0.088 | 0.01 |

TABLE 8

RESULTS FOR AA-400 OVER BONE CHAR

| Metal | Influent, mg/l | Effluent, mg/l | Detection Limit, mg/l |
|---|---|---|---|
| Aluminum | 0.16 | 0.170 | 0.04 |
| Cadmium | ND | ND | 0.008 |
| Chromium | ND | ND | 0.008 |
| Copper | 0.38 | 0.077 | 0.006 |
| Iron | 0.46 | 0.230 | 0.008 |
| Lead | ND | ND | 0.014 |
| Zinc | 0.16 | 0.130 | 0.01 |

TABLE 9

RESULTS FOR BONE CHAR OVER AA-400

| Metal | Influent, mg/l | Effluent, mg/l | Detection Limit, mg/l |
|---|---|---|---|
| Aluminum | 0.16 | 1.00 | 0.04 |
| Cadmium | ND | ND | 0.008 |
| Chromium | ND | ND | 0.008 |
| Copper | 0.38 | 0.060 | 0.012 |
| Iron | 0.46 | 0.350 | 0.008 |
| Lead | ND | ND | 0.014 |
| Zinc | 0.16 | 0.050 | 0.01 |

TABLE 10

RESULTS FOR BONE CHAR OVER AA-400 OVER MANGANESE GREEN SAND

| Metal | Influent Concentration mg/l | Effluent Concentration mg/l | Detection Limit, mg/l |
|---|---|---|---|
| Aluminum | 0.16 | 0.170 | 0.04 |
| Cadmium | ND | ND | 0.008 |
| Chromium | ND | ND | 0.008 |
| Copper | 0.38 | 0.059 | 0.012 |
| Iron | 0.46 | 0.160 | 0.008 |
| Lead | ND | ND | 0.014 |
| Zinc | 0.16 | 0.073 | 0.01 |

Table 11 shows test results at an EBCT of 5 minutes, which showed a slight degradation in performance. Lowering the contact time results in less media being required.

TABLE 11

RESULTS FOR FS-50 OVER BONE CHAR MEDIA (5 MINUTE EBCT)

| Metal | Influent Concentration mg/l | Effluent Concentration mg/l | Detection Limit, mg/l |
|---|---|---|---|
| Aluminum | 0.42 | NS | 0.04 |
| Cadmium | ND | ND | 0.008 |
| Chromium | ND | ND | 0.008 |
| Copper | 0.50 | 0.092 | 0.006 |
| Iron | 1.7 | 0.50 | 0.008 |
| Lead | 0.017 | ND | 0.014 |
| Zinc | 0.30 | 0.12 | 0.01 |

Table 12 shows additional test results where a mixture of media further degraded performance. However, mixing the media together would lower construction costs.

TABLE 12

RESULTS FOR FS-50 OVER BONE CHAR MEDIA (5 MINUTE EBCT)

| Metal | Influent Concentration mg/l | Effluent Concentration mg/l | Detection Limit, mg/l |
|---|---|---|---|
| Aluminum | 0.57 | ND | 0.04 |
| Cadmium | ND | ND | 0.008 |
| Chromium | ND | ND | 0.008 |
| Copper | 0.60 | 0.081 | 0.006 |
| Iron | 1.5 | 0.16 | 0.008 |
| Lead | 0.037 | ND | 0.014 |
| Zinc | 0.48 | 0.11 | 0.01 |

It was necessary to perform capacity tests on the preferred adsorption media in order to estimate how long the absorption media will last before replacement is required. Absorption media capacity can be estimated using either of two methods. First, a column test can be run until break through occurs. Break through occurs when the concentration of the target metal in the column effluent increases to some benchmark value, typically the regulatory discharge limit. These tests are conducted in the same manner as the column tests described earlier, only for an extended period of time. Since break through might occur only after running the column for thousands of bed volumes, an alternative method is often used to perform the test.

The second method of estimating adsorption capacity is a jar test. A known amount of a medium (typically a few grams) is placed in a bottle containing a liter of runoff water having known concentrations of pollutants. The bottle is capped and shaken. The liquid is then decanted and analyzed for pollutants. The difference in concentration of a pollutant, before and after the test, divided by the weight of the medium, is the adsorption capacity. The adsorption capacity is expressed as mg of metal adsorbed per gram of medium.

For the jar tests, three standard solutions of copper, lead, and zinc were prepared from metal chloride salt and deionized water. Thus, a standard solution contained only ions of one metal. A carefully weighed amount of medium was then added to liter volumes of each of the standard solutions. The solutions were mixed on an orbital shaker table. After mixing, the solutions were decanted through filter paper. The filtrate was then analyzed for total metal concentration. The difference in concentration multiplied by the sample volume and divided by weight of the medium is the adsorption capacity.

TABLE 13

RESULTS OF ABSORPTION CAPACITY TEST

| Metal | Iron Coated Activated Alumina mg metal/g media | Activated Alumina mg metal/g media | Bone Char mg metal/g media |
|---|---|---|---|
| Copper | 0.17 | 0.34 | 0.67 |
| lead | 0.74 | 0.89 | 2.22 |
| zinc | 0.15 | 0.15 | 1.19 |

The hydraulic conductivity of the absorption media were also measured. Hydraulic conductivity (also called permeability) is a measure of the resistance of a column of material to the passage of water. Knowledge of hydraulic conductivity is needed to determine the required depth of the adsorption bed, since hydraulic conductivity determines contact time. Table 14 shows hydraulic conductivity test results.

TABLE 14

RESULTS OF HYDRAULIC CONDUCTIVITY TEST

| Medium | Hydraulic Conductivity, ft, hr |
|---|---|
| FS-50 Activated alumina (28 × 48 mesh) | 3.9–6.1 |
| FS-50 Activated alumina (14 × 28 mesh) | 30.2–33.4 |
| AA-400 Activated alumina (28 × 48 mesh) | 4.2–4.6 |
| AA-400 Activated alumina (14 × 28 mesh) | 41.9–45.3 |
| Bone Char (8 × 30 mesh) | 56.9–61.2 |
| Washed ASTM C-33 concrete sand | 6.0–7.2 |
| Manganese greensand (60 mesh) | 7.4–10.0 |

It should be noted that the hydraulic conductivity of a bed made of layers of different materials will be smaller in magnitude than the lowest value of conductivity of the materials comprising the bed.

Figure 5:
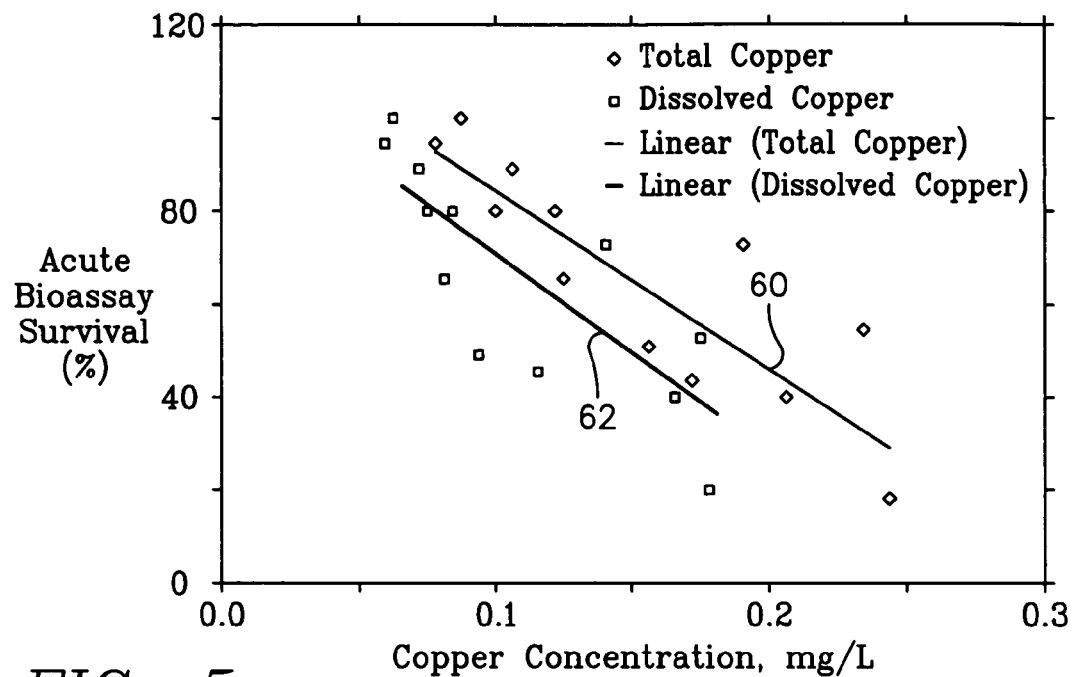
FIG. 5 is a plot which illustrate percent survival as a function of copper concentraion in storm water runoff.
Figure 6:
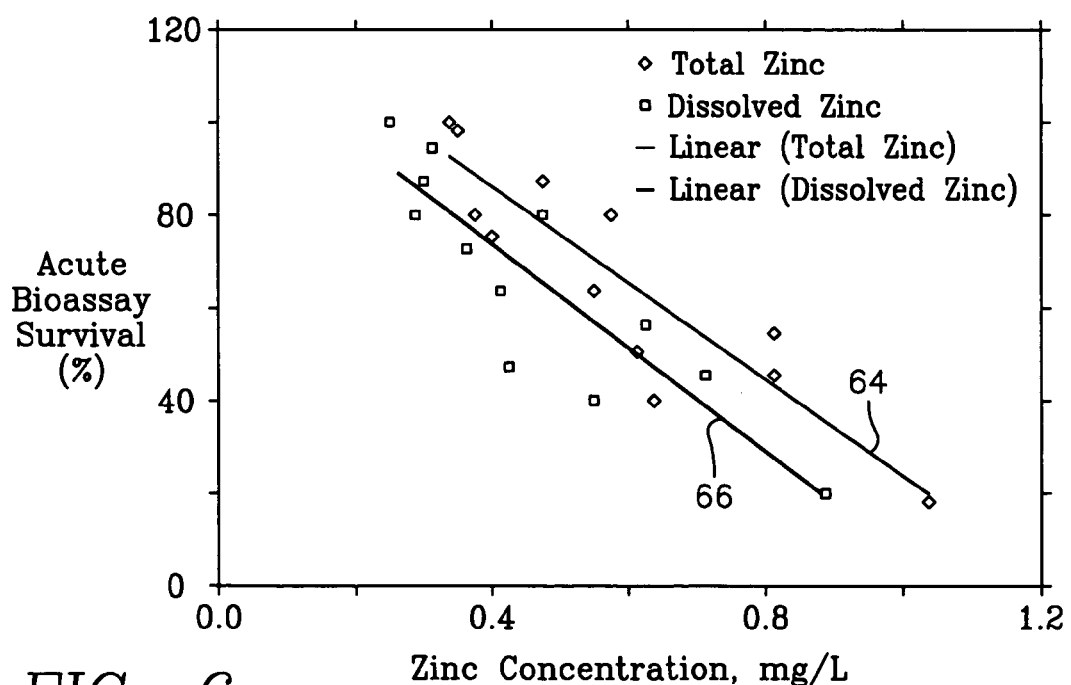
FIG. 6 is a plot which illustrate percent survival as a function of zinc concentraion in storm water runoff.

Referring to FIGS. 5 and 6, FIGS. 5 and 6 indicate that there is a high probability of passing a 96 hour-50% Lethal Concentration toxicity test if the concentration of copper is less than 100 µg/l and the concentration of zinc is less than 300 µg/l. For FIG. 5, plot 60 represents total copper and plot 62 represents dissolved copper. For FIG. 6, plot 64 represents total zinc and plot 66 represents dissolved zinc.

Therefore, the media developed will permit the military to pass the required toxicity tests under the most severe influent conditions.

The storm water runoff of pollutants at the Naval Regional Recycling Center (NRRC), in San Diego, Calif. over a period of several years is shown in Table 15, below. The drainage area for this facility is 3.55 acres.

TABLE 15

CHEMICAL ANALYSIS OF RUNOFF WATER AT OUTFALL 80. NRRC

| Metal | Average Concentration | Minimum Concentration | Maximum Concentration | Multi-Sector Permit Requirement |
|---|---|---|---|---|
| Aluminum | 1907 | 69 | 3660 | 750 |
| Cadmium | 10.3 | 0.55 | 34.8 | 15.9 |
| Chromium | 53.8 | 6.1 | 170 | No value listed |
| Copper | 321.6 | 37.1 | 1670 | 64 |
| Iron | 13581 | 102 | 89700 | No value listed |
| Lead | 417.8 | 27.1 | 1580 | 82 |
| Zinc | 1573 | 168 | 7830 | 117 |
| O&G | 1.6 | 0.51 | 3 | 15 |
| TSS | 273.9 | 10 | 1370 | 100 |
| MBAS | 1.85 | 0.28 | 6.3 | No value listed |
| pH | 6.88 | 5.9 | 7.8 | 6.0 to 9.0 |

The units for Table 15 are µg/L except for TSS which is in mg/L and pH which is in standard units. For Table 15, TSS is Total Suspended Solids, O&G is oil and grease, and MBAS is Methylene Blue Active Substance which a test for surfactants and other detergents.

An analysis of rainfall in San Diego, Calif. indicates that storms of less than 0.5 inches (in 24 hours) provide over 90 percent of all rain. Fewer than 5% of storms deliver more than an inch of rain.

The National Oceanographic and Atmospheric Administration gives the 2-year average rainfall total for San Diego as 1.69 inches in 24 hours. Thus, one possible value for the design storm is 0.33*1.69=0.56 inches of rain over 24 hours.

A Naval Facilities Engineering Service Center, Port Hueneme, Calif. report entitled *Revised Storm Water Pollution Prevention Plan for Camp Pendleton*, NFESC report ENV-1783, presents 10 years of weather statistics for Camp Pendleton, Calif. The data show that the average rain storm in January is 0.56 inches and the average rain storm in February is 0.58 inches. Based on this data, 0.56 inches of rain over 24 hours was selected as the design storm criteria.

The report also shows that the average total hours of rainfall in January is 11 hours and in February is 11.5 hours. The average number of storms for January, February, and March is 3.5. Dividing the average total hours of rainfall (11) by the average number of storm events (3.5) gives an average storm duration of 3.14 hours.

A National Soil Conservation Service report entitled *Urban Hydrology for Small Watersheds*, NSCS report TR-55 (1986) states that southern California has a "type I" rainfall distribution. The report also indicates that the mean duration for type I rainfall is about 3 hours. Therefore, 3 hours was selected for the mean storm duration.

Computer modeling of storm water runoff at NRRC, San Diego, Calif. indicates that the maximum expected flow would be 0.55 cubic feet per second (265 gallons per minute) and the event mean flow would be 0.092 CFS (44 gpm). Total runoff volume per storm is 5600 cubic feet (41,900 gallons).

Regulations require sampling the storm water runoff from NRRC within 1 hour of the first storm event of the storm season and during any two subsequent storms of the season.

Because of the unpredictability of rainfall, it was decided to produce runoff by making an artificial rain event. This was accomplished by discharging water vertically from fire hoses over areas of the NRRC compound. The flow rate was adjusted to produce "rain" at a rate of about 0.1 inches per hour. A truck tank was triple rinsed with hydrant water before the runoff water was loaded for analyses at the Naval Facilities Engineering Service Center (NFESC), Port Hueneme, Calif. At NFESC, the water was off-loaded into four 500-gallon plastic cone bottomed tanks. The water was continuously circulated and stirred to minimize settling of particles. Samples were collected as the runoff water was pumped into the truck. These samples were sent to the Public Works Center Environmental Laboratory in San Diego for analysis. Samples of water from the fire hydrant were also submitted for analysis. Table 16 displays the results from the sampling.

TABLE 16

INITIAL CHEMICAL ANALYSIS OF RUNOFF WATER

| Metal | Concentration in Storm Water μg/L | Concentration in Fire Hydrant Water μg/L | Multi-Sector Permit Requirement μg/L |
|---|---|---|---|
| Aluminum | 19,900 | 9 | 750 |
| Antimony | 138 | 7 | |
| Arsenic | 18 | ND | 168 |
| Beryllium | ND | ND | |
| Cadmium | 136 | ND | 15.9 |
| Chromium | 102 | ND | |
| Copper | 3,350 | 5 | 64 |
| Lead | 1,200 | 5 | 82 |
| Mercury | ND | ND | 2.4 |
| Nickel | 245 | ND | 1417 |
| Selenium | 14 | 6 | 238 |
| Silver | 4 | ND | 32 |
| Thallium | ND | ND | |
| Zinc | 6,860 | 169 | 117 |

The water was not tested for iron, total suspended solids, surfactants, oil and grease, or pH.

At NFESC, Port Hueneme, Calif. the water was off-loaded into four 500-gallon plastic cone bottomed tanks. The water was continuously circulated and stirred to minimize settling of particles.

Additional samples of the runoff water were taken when the tank truck arrived at NFESC. Table 17 presents the results of these analyses.

TABLE 17

CHEMICAL ANALYSIS OF RUNOFF WATER AT ARRIVAL AT NFESC

| Substance | Concentration in Storm Water, μg/L | Multi-Sector Permit Requirement μg/L |
|---|---|---|
| Aluminum | 2,800 | 750 |
| Cadmium | 50 | 15.9 |
| Chromium | ND | 20[1] |
| Copper | 1,800 | 64 |
| Iron | 6,100 | 1000 |
| Lead | 280 | 82 |
| Zinc | 2,400 | 117 |
| MBAS[1] | 690 mg/L | 0.5 mg/L |
| PH[1] | 8.3 SU | 6.0 to 9.0 SU |
| TSS | 270 mg/L | 100 mg/L |

[1]benchmark value. Multi-sector permit not required.

(1) benchmark value. Multi-sector permit not required.

A review of the data in Table 17 indicates that some of the metals were in the form of heavy particles that were either left in the tank truck when it was unloaded, or that quickly settled to the bottoms of the storage tanks.

A sample of water from the storage tanks was split into two parts. One part was filtered through a 0.45-micron fiberglass filter; the other part was not filtered. Both samples were then analyzed for metals using EPA Method 200.7: Inductively Coupled Plasma Atomic Emission Spectroscopy. Table 18 shows results from the ulta-filtration tests.

TABLE 18

RESULTS OF ULTRA-FILTRATION TEST

| Metal | Unfilterd μg/L | Filtered μg/L | Percent Removed |
|---|---|---|---|
| Aluminum | 2,800 | 280 | 90 |
| Cadmium | 50 | ND | 100 |
| Chromium | ND | ND | NA |
| Copper | 1,900 | 820 | 57 |
| Iron | 6,100 | 110 | 98 |
| Lead | 280 | ND | 100 |
| Zinc | 2,400 | 250 | 89 |

Filtration through a 0.45-micron filter is a standard test to determine how total metals concentration is partitioned between particulate and dissolved forms. The metals passing through a 0.45-micron filter are assumed to be in ionic form although the metals may also be in the form of small colloids. Metals that do not pass through the filter are assumed to be in particle form. Table 18 indicates that, with the exception of aluminum, copper and zinc, the metals of interest appear to be largely in the form of solid particles or are ions of metals attached to particles of other materials such as clays, sand, and organic matter. Only copper, zinc, and aluminum appear to have a significant ionic component.

Figure 7:
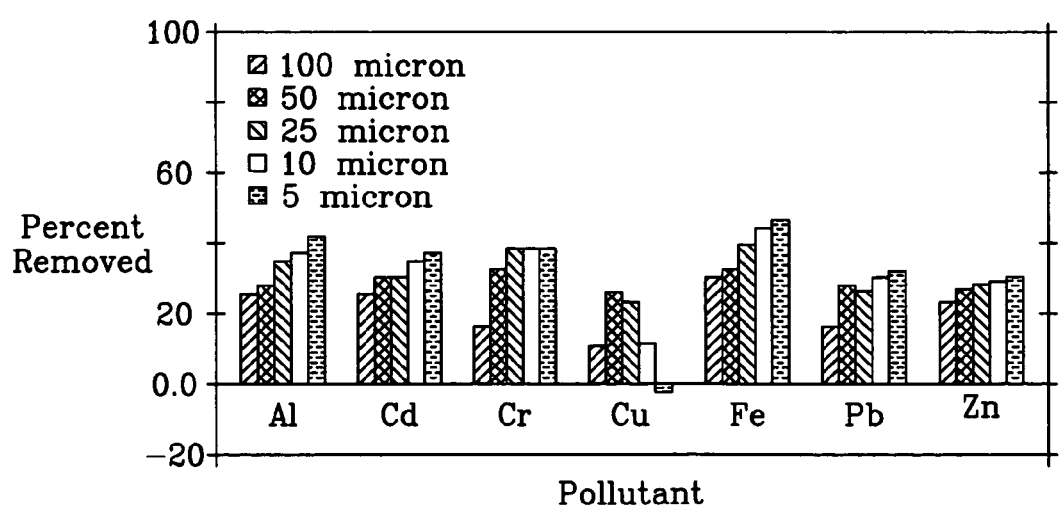
FIG. 7 illustrates a bar chart which depicts total metals removed from storm water runoff by filters of different sizes.

Referring to FIG. 7, additional filtration tests were performed to determine a rough particle size distribution. The results are presented in FIG. 7. FIG. 7 shows that a coarse 100-micron filter can remove 10 to 25 percent of the metals. A 5-micron filter can remove 30 to 45 percent of the metals. This would indicate that 55 to 70 percent of the total metals are in the form of particles smaller than 5 microns or as ions. Note that copper is the most difficult metal to filter out of the water. Zinc is second most difficult. These results are consistent with the results presented in Table 18.

Figure 8:
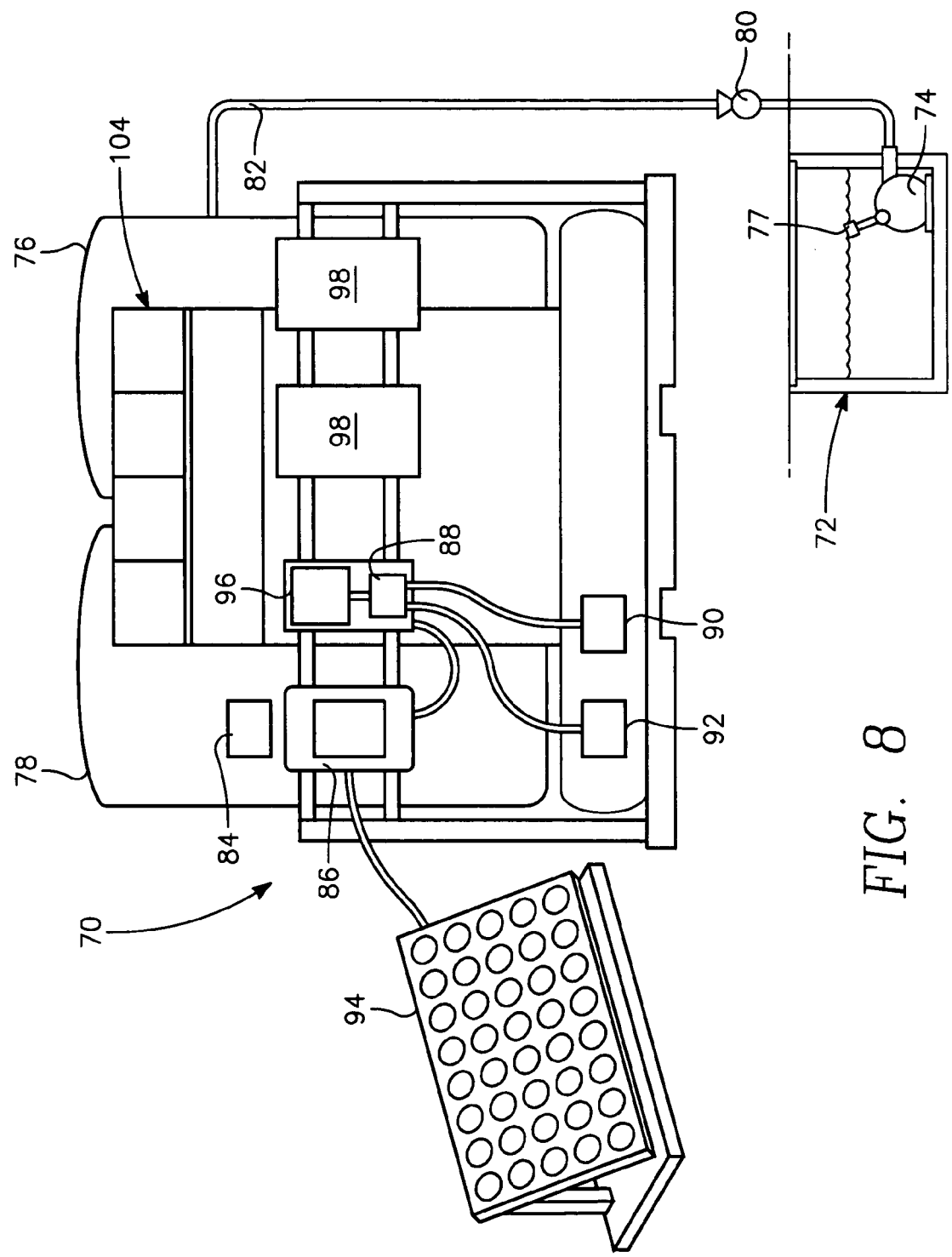
FIG. 8 illustrates a storm water treatment test device which was developed for use at a variety of locations to collect storm water for testing of metals.

Referring to FIG. 8, a storm water treatment test device 70 was developed for use at a variety of locations to test storm water. Runoff water flows into a small sump 72 positioned in the ground with a cover screen. A screen keeps trash and debris from entering the sump 72. A 12-Volt sump pump 74 located in sump 72 pumps the water into the first tank 76 of two 500-gallon cone bottom tanks 76 and 78. A float switch 77 attached to the sump pump 74 turns the pump on and off. The sump pump 74 flow rate has been measured at 15 gpm against a head of 8 feet. A check valve 80 at the discharge of the sump pump keeps the water in the piping system 82 from flowing back into the sump when the pump 74 shuts off.

The outlets of the two 500-gallon tanks 76 and 80 are plumbed in parallel, so that the water levels are equal in the two tanks. An ultrasonic level sensor 84 is installed at the top of the second 500-gallon tank 78. The level sensor 84 outputs a 4–20 mA signal that is proportional to the water level in the tank. The output of the level sensor 84 is input to a programmable logic controller (PLC) 86. A Koyo model D0-05DR-D PLC was used for this application. The PLC 86 features 8 DC inputs, 6 relay outputs, and operates on 12 to 24 VDC. The PLC 86 is equipped with an optional 4 channel analog input module. One analog channel was connected to the tank level sensor and another was used to measure battery voltage. The PLC 86 is programmed to turn pumps and other equipment on and off in the desired sequence depending on the water level in the tanks 76 and 78. The PLC 86 also monitors battery voltage and can "lock out" pumps if the voltage from batteries 90 and 92 becomes too low. This prevents damage to the batteries 90 and 92 and speeds recharging.

When approximately 500 gallons of runoff water has been collected, the PLC 86 turns on two transfer pumps that pump the water from the tanks 76 and 78 to treatment system. The transfer pumps are plumbed in parallel. Each transfer pump delivers 7.5 GPM against an 8 foot head. The transfer pumps run on 12 VDC.

The 12 Volt power to run the system is supplied by four deep-discharge gel cell batteries, two of which are illustrated in FIG. 8. The batteries 90 and 92 are recharged by a small array of photovoltaic solar collectors 94. A solid state regulator 88 controls the battery charging rate and prevents the batteries from being overcharged. The system runs for 8 to 10 hours on a normal battery charge. A Tri-Metric model 2020 battery monitor and amp-hour meter 96 is used to monitor battery condition and power consumption. An hour meter records the total number of hours the transfer pumps operate. This is a measure of how much water was treated.

The test stand operates until either (1) runoff stops filling the sump, or (2) the battery voltage drops below the "pump lock out" voltage. When the sump 72 is dry, the sump pump 74 shuts off. The transfer pumps continue to run until there is only about 50 gallons of water remaining in the two storage tanks 76 and 78, then the transfer pumps shut off. If the battery voltage drops below the pump lock out voltage (about 10 volts), the pumps stop. The pumps are not allowed to start until the batteries 90 and 92 have been recharged to 12 VDC.

Figure 9:
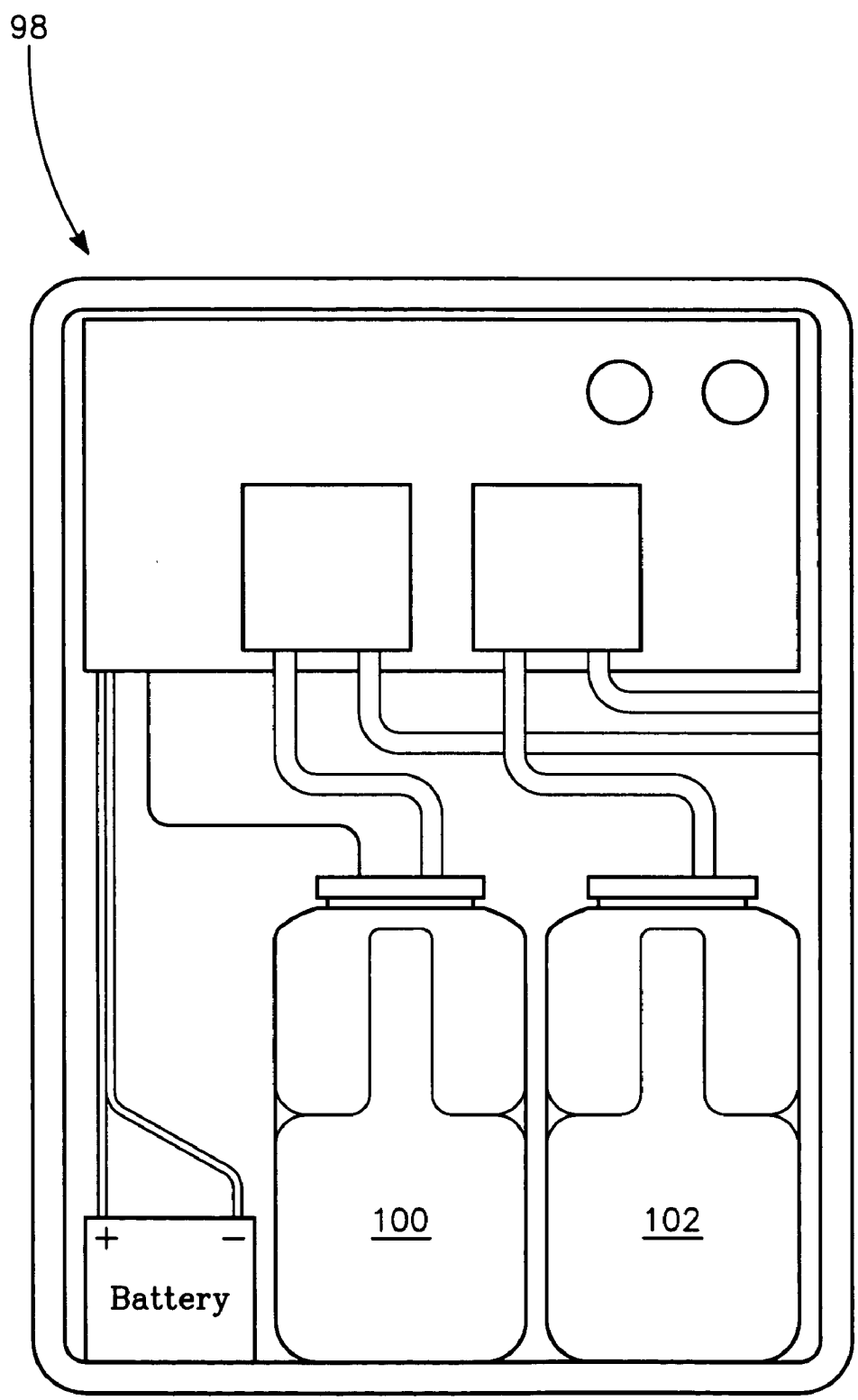
FIG. 9 illustrates one of the two automated sampling systems for the test stand of FIG. 8.

Referring to FIG. 9, FIG. 9 shows one of the two automated sampling systems 98 on the test stand: one for sampling the influent and one for sampling the effluent. One automated sampler collects samples of the process influent and the other automated sampler collects samples of the process effluent. Each automated sampler 98 is capable of collecting both a "grab" sample and a "composite" sample. A grab sample is a sample collected at the beginning of treatment system operations for each storm event. In a grab sample, the sample pump runs continuously until the sample bottle 100 is full. A composite sample is a sample collected intermittently during operation. For example, to gather a composite sample the sample pump might collect 100 ml of runoff water every 30 minutes until the sample bottle 102 is full. A composite sample is a time average of the samples of runoff water.

Both grab and composite samples were transported to the Navy Environmental Chemistry Laboratory at Naval Air Station North Island, San Diego, Calif. for chemical analysis. The Navy Environmental Chemistry Laboratory is an Environmental Protection Agency certified laboratory. Laboratory analyses were performed to determine metals concentrations, Total Suspended Solids, and oil and grease in the process influent and effluent. The process water was analyzed for the following metals: aluminum, cadmium, chromium, copper, iron, lead, and zinc. Other metals, such as mercury, silver, and beryllium have not been found in runoff from Naval Regional Recycling Center, San Diego, Calif.

A commercial available storm water filter system 104 (FIG. 8) made by StormWater Management, Inc (SMI) was tested at NFESC. The test were conducted at the manufacture's laboratory using water samples shipped to SMI by the Navy, and in the field. The water filtration system 104 in FIG. 8 is a four-filter SMI treatment system installed on the test stand 70. The storm water filter system 104 was tested to provide a baseline for performance and cost comparisons.

The filter medium used water filtration system 104 is a mixture of pelletized leaf compost and peat moss called Metal Rx by the manufacturer. The field test unit collected performance data from three storms. Table 19 presents test results from the system 104.

TABLE 19

TEST RESULTS FOR METAL RX MEDIA

| | Copper | | | Zinc | | |
|---|---|---|---|---|---|---|
| Lab | [C] in, µg/L | [C] out, µg/L | % Reduce | [C] in, µg/L | [C] out, µg/L | % Reduce |
| SMI | 866 | 349 | 60 | 1190 | 185 | 84 |
| NFESC | 840 | 310 | 63 | 430 | 170 | 60 |
| Storm 1 | 240 | 85 | 65 | 380 | 120 | 68 |
| Storm 2 | 212 | 90 | 58 | 410 | 100 | 76 |
| Storm 3 | 502 | 229 | 54 | 980 | 200 | 80 |

The results show a 60% reduction in influent copper concentration and a 70% reduction in influent zinc concentration, generally independent of the magnitude of metal concentration in the influent. The two test results that show high zinc removal correspond to high zinc concentration in the influent. It is believed that the water samples used for these tests contained an unusually high amount of larger zinc particles and that in these tests the SMI technology was removing most of the zinc by mechanical straining rather than adsorption.

The data in Table 19 suggest that the SMI filter system would work well enough to permit passage of the toxicity test when the inlet concentrations of metals are low, but may not be effective enough when the inlet concentrations of metals are high such as during the first storms of the season. This observation was borne out by results of tests at NASSCO where the effluent from the treatment system passed the 96 hours-50% Lethal Concentration toxicity test only 33% of the time. The circumstances where the treatment system passed the toxicity test were late season storms, when the influent metals concentrations were much reduced.

Figure 10:
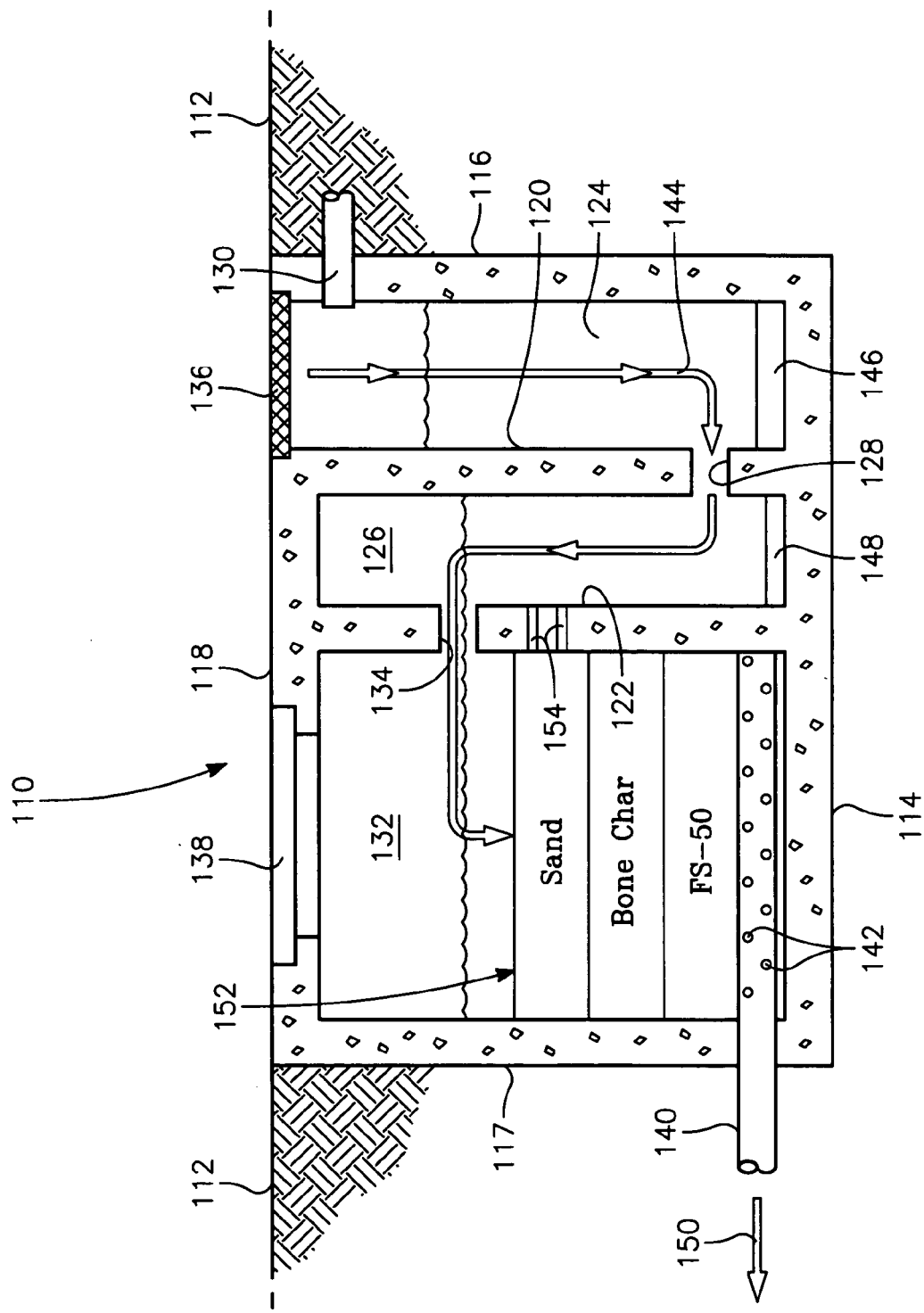
FIG. 10 illustrates a view in section of a preferred embodiment of the present invention for removing metals from storm water runoff.

Referring to FIG. 10, a sand filter treatment facility has been substantially modified to allow the use of special adsorbent materials to increase metals removal efficiency.

The sand filter treatment facility 110, which is buried in the ground 112 includes a rectangular shaped concrete base 114, four upstanding concrete side walls 116 and 117 which extend vertically upward from base 114, a rectangular shaped ground level concrete cover 118 and two parallel concrete inner walls 120 and 122 which also extend vertically upward from base 114. A primary pretreatment chamber 124 is formed between side wall 116 and inner wall 120. A secondary pretreatment chamber 126 is formed adjacent to primary pretreatment chamber 124 between inner walls 120 and 122. An opening 128 located near the lower end of wall 120 allows for fluid flow between primary pretreatment chamber 124 and secondary pretreatment chamber 126. There is also an overflow drain pipe 130 located near the upper end of side wall 116 which extends outward from facility 110 into the ground.

An absorbent chamber 132 is formed between inner wall 122 and side wall 117. A weir 134 is provided near the upper end of wall 122 which allows for fluid flow between pretreatment chamber 126 and absorbent chamber 132.

An inlet grate 136 is located at ground level within concrete cover 118 above chamber 124. An access hatch 138 is located at ground level within concrete cover 118 above absorbent chamber 132.

Located at the bottom of absorbent chamber 132 is a porous collection pipe 140 which has a plurality of openings 142. Three layers of absorbent materials, which comprise an absorption bed 152, are stacked one on top of another above collection pipe 140. The bottom layer of absorbent material is FS-50 Activated Alumina, the middle layer of absorbent material is bone char and the top layer of absorbent material is sand. FS-50 Activated Alumina is an activated alumina commercially available from Alcan Incorporated of Montreal, Canada. The direction of fluid flow through sand filter treatment facility 110 is indicated by arrow 144. Clean water exits the treatment facility through collection pipe 140 into the ground in the manner indicated by arrow 150.

Storm water runoff enters the sand filter treatment facility 110 through an inlet grate 136. The inlet grate 136 removes coarse trash, leaves and debris. The runoff then fills the pretreatment chamber 124 and the secondary pretreatment chamber 126. The pretreatment chambers 124 and 126 are sized to provide sufficient residence time to allow larger particles in the runoff to settle to the bottom of the chamber. Sediment 146 forms at bottom of chamber 124 and sediment 148 forms at the bottom of chamber 148.

The pre-treated water then flows over a weir 134 and onto the filter/adsorption bed 152. Troughs or distribution plates (not shown) can be used to distribute the water evenly over the bed. The treated water is collected at the bottom of the absorption bed 152 with perforated collection pipe 140 or a bed of stones, then conveyed to the discharge channel exiting pipe 140 in the manner indicated by arrow 150.

This technology is best suited to small, impervious drainage areas. It should not be used in situations where there is potential for high sediment loading, such as where run off from a constructions site could enter the system.

A series of small holes 154 in the wall 122 of the pretreatment chamber 126 will allow the water in the pretreatment chamber 126 to slowly drain from the pretreatment chamber 126 into the adsorbent chamber 132 at the end of the storm to prevent stagnation of storm water in pretreatment chambers 124 and 126.

Although not illustrated, a small sump pump can be used to pump any water remaining in the pretreatment chamber after cession of the storm out of the chamber and onto the filter bed. These features prevent standing water in the pretreatment chamber and preclude the system becoming a breeding site for mosquitoes and other insects.

The top of the first layer of media slowly becomes plugged with very fine sediments (e.g. 2–200 microns) and must be periodically cleaned or replaced. Therefore, approximately one inch of the top filter medium must be periodically removed and replaced with clean media. Analysis has shown that media should last for many years before the adsorption capacity is exceeded. Sand filters can go 3 to 5 years between maintenance periods when installed at parking lots and other locations were there is minimal sediment loading.

Figure 11:
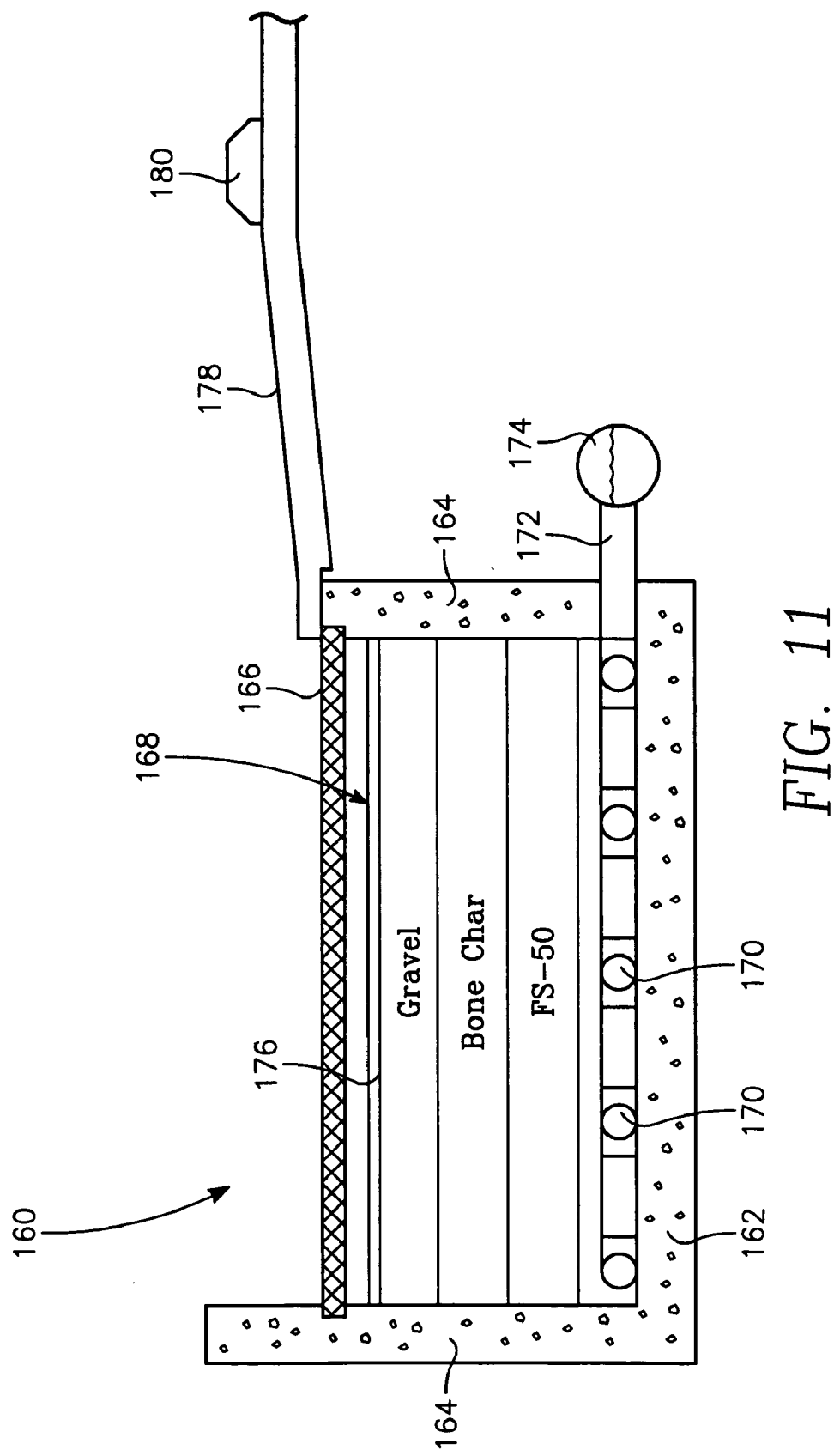
FIG. 11 illustrates a view in section of an alternate embodiment of the present invention for removing metals from storm water runoff.

Referring to FIG. 11, an alternative embodiment of the treatment facility, designated generally by the reference numeral 160 is shown in FIG. 11. The facility is fabricated as a pre-cast concrete fault having a rectangular shaped base 162, four upstanding side walls 164 which extend vertically upward from base 162 and a fiber-glass grate cover 166 positioned at the upper end of the pre-cast concrete fault. Facility 160 includes an absorption chamber 168 formed within the four upstanding sidewalls 164. A plurality of porous collection pipes 170 rest on the upper surface of base 162. One end of each collection pipe terminates at a discharge pipe 172 allowing fluid flow from absorption chamber 168 through collection pipes 170 and then through discharge pipe 172 to a storm drain 174.

As shown in FIG. 11, three layers of absorbent materials, which comprise an absorption bed 176, are stacked one on top of another above collection pipe 170. The bottom layer of absorbent material is FS-50 Activated alumina, the middle layer of absorbent material is bone char and the top layer of absorbent material is gravel. A paved apron 178 located at the top of the right side wall 164 allows storm water to drain into the treatment facility 160. The right edge of the paved apron 178 has a porous pavement curb 180 which acts as a course filter.

The base 162 has an overall width of 5.98 feet, and a length of 11 feet. The left side wall has a height of 3.5 feet and the right side wall has a height of 2.50 feet. The width across the top of chamber 168 is 5.0 feet and the length is 10 feet. The depth of chamber 1.67 feet above the collection pipes 170. The length of apron 178 from the curb 180 is 3.5 feet with a slope 7%.

An optional concrete electrical line cover of 4.5 feet in length was fabricated for the embodiment illustrated in FIG. 11.

The following Table shows the results for metal removal using the present invention for November 2004 as shown in FIG. 10. The method used for the test is U.S. Environmental Protection Agency method 200.7 which is a method for the Determination of metals in environmental samples and is directed primarily toward aqueous samples such as wastewater, drinking and ambient waters. The method is entitled "Determination of Metals and Trace Elements in Water and Waste by Inductively Coupled Plasma-Atomic Emission Spectrometry".

TABLE 20

| Parameter | Average Influent | Average Effluent | Units | Limit |
|---|---|---|---|---|
| Aluminum | 0.695 | 0.087 | mg/L | 0.750 |
| Cadmium | 0.033 | ND | mg/L | 0.0159 |
| Chromium | 0.000 | ND | mg/L | 0.020 |
| Copper | 0.938 | 0.056 | mg/L | 0.064 |

TABLE 20-continued

| Parameter | Average Influent | Average Effluent | Units | Limit |
|---|---|---|---|---|
| Iron | 1.95 | 0.136 | mg/L | 1.00 |
| Lead | 0.101 | 0.005 | mg/L | 0.082 |
| Zinc | 2.100 | 0.069 | mg/L | 0.117 |

The following Table shows the results for metal removal using the present invention for February 2005. The method used for the test is U.S. Environmental Protection Agency method 200.8 which is a method for the Determination of metals in environmental samples and is directed primarily toward aqueous samples such as wastewater, drinking and ambient waters. The method is entitled "Determination of Trace Elements in Water and Waste by Inductively Coupled Plasma-Mass Spectrometry".

TABLE 20

| Parameter | Average Influent | Average Effluent | Units | Report Limit |
|---|---|---|---|---|
| Aluminum | 0.280 | 0.180 | mg/L | 0.750 |
| Cadmium | 0.008 | ND | mg/L | 0.016 |
| Chromium | ND | ND | mg/L | 0.020 |
| Copper | 0.184 | 0.014 | mg/L | 0.064 |
| Iron | 0.800 | 0.300 | mg/L | 1.00 |
| Lead | 0.014 | ND | mg/L | 0.082 |
| Zinc | 0.630 | 0.030 | mg/L | 0.117 |

The following Table illustrates the test results for a 1/20th scale model of the trench design illustrated in FIG. 10.

The EPA method used is EPA 200.8 and the Table illustrates a summary of the results from 5 test.

TABLE 21

| Parameter | Influent mg/L | Effluent mg/K | Detection Limit mg/L |
|---|---|---|---|
| Aluminum | 0.330–.860 | ND–0.100 | 10 |
| Cadmium | ND–0.012 | ND | 1 |
| Chromium | ND–0.18 | ND | S |
| Copper | 1.90–4.70 | ND–0.021 | 5 |
| Iron | 3.00–8.20 | ND–0.170 | 100 |
| Lead | 0.150–0.360 | ND | 5 |
| Zinc | 0.680–1.700 | ND–0.041 | 10 |

The following Table illustrates acute toxicity results for November 2004 with a test organism of shrimp (Mysidopsis bahia).

TABLE 22

| % effluent | % Survival |
|---|---|
| 100 | 100 |
| 50 | 100 |
| 25 | 97.5 |
| 12.5 | 97.5 |
| 6.25 | 100 |
| control | 100 |

The invention claimed is:

1. A sand filter treatment facility, which is buried in the ground, for removing toxic metals from storm water, comprising:
(a) a rectangular shaped concrete base;
(b) four concrete side walls which extend vertically upward from said concrete base, said four concrete side walls being attached to one another to form a rectangular shaped assembly of upstanding concrete side walls having an interior space;
(c) first and second concrete inner walls positioned within the interior space of said assembly of upstanding concrete side walls, said first and second concrete inner walls being parallel and extending vertically upward from said concrete base;
(d) first and second pretreatment chambers located within the interior space of said assembly of upstanding concrete side walls on opposite sides of said first concrete inner wall, said first concrete inner wall including a fluid passageway in proximity to the bottom end of said first concrete inner wall to allow for fluid flow from said first pretreatment chamber to said second pretreatment chamber;
(e) an absorbent chamber located within the interior space of said assembly of upstanding concrete side walls adjacent said second pretreatment chamber on an opposite side of said second concrete inner wall, said second concrete inner wall including a fluid passageway in proximity to the upper end of said second concrete inner wall to allow for fluid flow from said second pretreatment chamber to said absorbent chamber;
(f) a rectangular shaped ground level concrete cover mounted atop said assembly of upstanding concrete side walls;
(g) an inlet grate located at ground level within said concrete cover above said first pretreatment chamber;
(h) a porous collection pipe having a plurality of openings, said porous collection pipe being positioned at the bottom of said absorbent chamber and passing through one of said four side walls into the ground to allow for fluid flow from said absorbent chamber into the ground;
(i) an absorption bed consisting of first, second and third layers of absorbent materials stacked one on top of another within said absorbent chamber above said porous collection pipe, said first, second and third layers of absorbent materials removing fine particles of said toxic metals from said storm water to provide clean water to said collection pipe; and
(j) a paved apron having one end terminating at the sidewall adjacent said inlet grate, said paved apron being sloped at approximately seven percent to allow said storm water to drain into said first pretreatment chamber of said sand filter treatment facility, and the opposite edge of said paved apron having a porous pavement curb which functions as a coarse filter for said storm water flowing through said porous pavement curb.

2. The sand filter treatment facility of claim 1 wherein said first, second and third layers of absorbent materials removing said fine particles of said toxic metals from said storm water comprise a bottom layer of activated alumina, a middle layer of bone char and a top layer of sand.

3. The sand filter treatment facility of claim 1 wherein said first, second and third layers of absorbent materials removing said fine particles of said toxic metals from said storm water comprise a bottom layer of activated alumina, a middle layer of bone char and a top layer of gravel.

4. The sand filter treatment facility of claim 1 wherein said inlet grate allows said storm water to flow into said first pretreatment chamber removing coarse trash, leaves and debris from said storm water flowing into said first pretreatment chamber.

5. The sand filter treatment facility of claim 1 wherein said first pretreatment chamber removes large particles of said toxic metal from said storm water flowing into said first pretreatment chamber wherein said large particles of said toxic metals removed from said storm water form as sediment at the bottom of said first pretreatment chamber.

6. The sand filter treatment facility of claim 1 wherein said second pretreatment chamber removes large particles of said toxic metal from said storm water flowing into said second pretreatment chamber wherein said large particles of said toxic metals removed from said storm water form as sediment at the bottom of said second pretreatment chamber.

7. The sand filter treatment facility of claim 1 wherein said concrete cover includes an access hatch located at ground level within said concrete cover above said absorbent chamber.

8. The sand filter treatment facility of claim 1 further comprising an overflow drain pipe located near the upper end first pretreatment chamber and extending from said first pretreatment chamber through said side wall adjacent said pretreatment chamber into the ground to allow for an overflow of said storm water from said first pretreatment chamber into the ground.

9. The sand filter treatment facility of claim 1 wherein said sand filter treatment facility operates to remove said toxic metals from said storm water including toxic particles of aluminum, cadmium, chromium, copper, iron, lead, and zinc.

10. The sand filter treatment facility of claim 1 further comprising a series of apertures located in said second inner wall of said sand filter treatment facility to allow the storm water in said second pretreatment chamber to drain from said second pretreatment chamber into said adsorbent chamber at the end of a storm to prevent stagnation of said storm water in said first and second pretreatment chambers.

11. A sand filter treatment facility, which is buried in the ground, for removing toxic metals from storm water, comprising:
   (a) a rectangular shaped concrete base;
   (b) four concrete side walls which extend vertically upward from said concrete base, said four concrete side walls being attached to one another to form a rectangular shaped assembly of upstanding concrete side walls having an interior space;
   (c) first and second concrete inner walls positioned within the interior space of said assembly of upstanding concrete side walls, said first and second concrete inner walls being parallel and extending vertically upward from said concrete base;
   (d) first and second pretreatment chambers located within the interior space of said assembly of upstanding concrete side walls on opposite sides of said first concrete inner wall, said first concrete inner wall including a fluid passageway in proximity to the bottom end of said first concrete inner wall to allow for fluid flow from said first pretreatment chamber to said second pretreatment chamber, wherein said first and second pretreatment chambers removes large particles of said toxic metal from said storm water flowing into said first and second pretreatment chambers, said large particles of said toxic metals removed from said storm water forming as sediment at the bottom of said first and second pretreatment chambers;
   (e) an absorbent chamber located within the interior space of said assembly of upstanding concrete side walls adjacent said second pretreatment chamber on an opposite side of said second concrete inner wall, said second concrete inner wall including a fluid passageway in proximity to the upper end of said second concrete inner wall to allow for fluid flow from said second pretreatment chamber to said absorbent chamber;
   (f) a rectangular shaped ground level concrete cover mounted atop said assembly of upstanding concrete side walls;
   (g) an inlet grate located at ground level within said concrete cover above said first pretreatment chamber, wherein said inlet grate allows said storm water to flow into said first pretreatment chamber removing coarse trash, leaves and debris from said storm water flowing into said first pretreatment chamber;
   (h) a porous collection pipe having a plurality of openings, said porous collection pipe being positioned at the bottom of said absorbent chamber and passing through one of said four side walls into the ground to allow for fluid flow from said absorbent chamber into the ground;
   (i) an absorption bed consisting of bottom layer of activated alumina, a middle layer of bone char and a top layer of sand stacked one on top of another within said absorbent chamber above said porous collection pipe, said bottom layer of activated alumina, said middle layer of bone char and said top layer of sand removing fine particles of said toxic metals from said storm water to provide clean water to said collection pipe, wherein said fine particles of said toxic metals removed from said storm water include toxic particles of aluminum, cadmium, chromium, copper, iron, lead, and zinc; and
   (j) a paved apron having one end terminating at the sidewall adjacent said inlet grate, said paved apron being sloped at approximately seven percent to allow said storm water to drain into said first pretreatment chamber of said sand filter treatment facility, and the opposite edge of said saved apron having a porous pavement curb which functions as a coarse filter for said storm water flowing through said porous pavement curb.

12. The sand filter treatment facility of claim 11 further comprising a series of apertures located in said second inner wall of said sand filter treatment facility to allow the storm water in said second pretreatment chamber to drain from said second pretreatment chamber into said adsorbent chamber at the end of a storm to prevent stagnation of said storm water in said first and second pretreatment chambers.

13. The sand filter treatment facility of claim 11 wherein said concrete cover includes an access hatch located at ground level within said concrete cover above said absorbent chamber.

14. A method for removing toxic metals from storm water comprising the steps of:
   (a) directing said storm water along a fluid flow path to an inlet grate located on a top portion of a treatment facility, wherein a sloped paved apron which has one end terminating at a sidewall of said treatment facility adjacent said inlet grate directs said storm water to said inlet grate, said sloped paved apron having an opposite edge which includes a porous pavement curb, said porous pavement curb functioning as a coarse filter for said storm water flowing through said porous pavement curb, said sloped paved apron being sloped at approximately seven percent to allow said storm water to drain into a pretreatment chamber of said treatment facility;

(b) passing said storm water through said inlet grate to remove coarse trash, leaves and debris from said storm water;
(c) directing said storm water along said fluid flow path into said pretreatment chamber located within said treatment facility;
(d) removing large particles of said toxic metals from said storm water while said storm water is in said pretreatment chamber wherein the large particles of said toxic metals fall to the bottom of said pretreatment chamber to form a layer of sediment at the bottom of said pretreatment chamber;
(e) directing said storm water along said fluid flow path from said pretreatment chamber to an absorbent chamber within said treatment facility, wherein said absorbent chamber includes an absorption bed of absorption materials in proximity to the bottom of said absorbent chamber;
(f) removing fine particles of said toxic metals from said storm water by passing said storm water through said absorption bed of absorption materials which results in clean water exiting said absorption bed of absorption materials; and
(g) directing said clean water along said fluid flow path to a collection pipe having a plurality of openings wherein said clean water passes through the openings in said collection pipe and then exits said collection pipe into the ground.

15. The method of claim 14 wherein said absorption bed of absorption materials comprises a bottom layer of activated alumina, a middle layer of bone char and a top layer of gravel.

16. The method of claim 14 wherein said pretreatment chamber and said absorption bed of absorption materials operate to remove said toxic metals from said storm water including toxic particles of aluminum, cadmium, chromium, copper, iron, lead, and zinc.

\* \* \* \* \*